United States Patent
Shrivastava (10) Patent No.: US 11,743,166 B2
(45) Date of Patent: Aug. 29, 2023

(54) PROVISIONING NON-COLORED SEGMENT ROUTING LABEL SWITCHED PATHS VIA SEGMENT ROUTING POLICIES IN BORDER GATEWAY PROTOCOL

(71) Applicant: Juniper Networks, Inc., Sunnyvale, CA (US)

(72) Inventor: Amit Kumar Shrivastava, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 17/247,795

(22) Filed: Dec. 23, 2020

(65) Prior Publication Data
US 2021/0385150 A1   Dec. 9, 2021

(30) Foreign Application Priority Data
Jun. 3, 2020   (IN) .............................. 202041023284

(51) Int. Cl.
*H04L 45/02* (2022.01)
(52) U.S. Cl.
CPC .................................... *H04L 45/02* (2013.01)
(58) Field of Classification Search
CPC . H04L 45/02; H04L 41/0806; H04L 41/0893; H04L 67/1097
See application file for complete search history.

(56) References Cited

U.S. PATENT DOCUMENTS

| | | | | |
|---|---|---|---|---|
| 7,787,381 B2 * | 8/2010 | Small | ................... | H04L 41/5077 370/395.43 |
| 7,814,227 B2 * | 10/2010 | Vasseur | ................... | H04L 45/04 709/241 |
| 8,023,504 B2 * | 9/2011 | Shah | ....................... | H04L 45/00 370/398 |
| 9,882,805 B2 * | 1/2018 | Thankappan | ......... | H04L 45/125 |
| 2017/0017510 A1 * | 1/2017 | Itoh | ........................... | G06F 9/46 |

OTHER PUBLICATIONS

Filsfils et al., "Segment Routing Architecture," Internet Engineering Task Force (IETF), RFC 8402, Jul. 2018, 33 pp.
Filsfils et al. "Segment Routing Use Cases" draft-filsfils-spring-segment-routing-use-cases-01, Network Working Group, Internet—Draft, Oct. 21, 2014, 35 pp.
(Continued)

*Primary Examiner* — Chandrahas B Patel
(74) *Attorney, Agent, or Firm* — Shumaker & Sieffert, P.A.

(57) ABSTRACT

Techniques are described for provisioning non-colored segment routing label switched paths (LSPs) via segment routing policies in border gateway protocol (BGP). For example, an ingress router receives a segment routing policy advertisement specifying an endpoint of one or more paths, and a policy color field of the one or more paths, wherein the policy color field is specified with a designated value that causes the network device to store the one or more paths in a data structure that stores non-colored paths. The ingress router determines that the policy color is specified with the designated value. The ingress router, in response to determining that the policy color is specified with the designated value, stores the one or more paths in the data structure that stores non-colored paths.

20 Claims, 4 Drawing Sheets

(56) References Cited

OTHER PUBLICATIONS

Filsfils et al. "Segment Routing Policy Architecture" draft-ietf-spring-segment-routing-policy-06.txt, Spring Working Group, Internet—Draft, Dec. 14, 2019, 35 pp.
Previdi et al., "Source Packet Routing in Networking (Spring) Problem Statement and Requirements," RFC 7855, Internet Engineering Task Force (IETF), May 2016, 19 pp.
Bashandy et al. "Segment Routing with the MPLS Data Plane" RFC 8660, Internet Engineering Task Force (IETF), Dec. 2019, 29 pp.
Previdi et al., "Advertising Segment Routing Policies in BGP," draft-ietf-idr-segment-routing-te-policy-08, Network Working Group, Nov. 18, 2019, 39 pp.
Gredler et al., "North-Bound Distribution of Link-State and Traffic Engineering (TE) Information Using BGP," Internet Engineering Task Force (IETF), RFC 7752, Mar. 2016, 49 pp.
Moy, "OSPF Version 2," Network Working Group, RFC 2328, Apr. 1998, 244 pp.
Coltun et al., "OSPF for IPv6," Network Working Group, RFC 5340, Jul. 2008, 95 pp.
Sheth et al., "OSPF Hybrid Broadcast and Point-to-Multipoint Interface Type," RFC 6845, Internet Engineering Task Force, IETF, Jan. 2013, 9 pp.
Oran, "OSI IS-IS Intra-domain Routing Protocol," RFC 1142, Network Working Group, Feb. 1990, 157 pp.
Lindem et al. "OSPFv3 Link State Advertisement (LSA) Extendibility" Internet Engineering Task Force (IETF), RFC 8362, Apr. 2018, 33 pp.
Li et al., "IS-IS Extensions for Traffic Engineering," Network Working Group, RFC 5305, Oct. 2008, 18 pp.
Vasseur et al., "Path Computation Element (PCE) Communication Protocol (PCEP)," RFC 5440, Network Working Group, Mar. 2009, 76 pp.
Enns et al., "Network Configuration Protocol (NETCONF)," RFC 6241, Internet Engineering Task Force, IETF, Jun. 2011, 113 pp.

\* cited by examiner

PROVISIONING NON-COLORED SEGMENT ROUTING LABEL SWITCHED PATHS VIA SEGMENT ROUTING POLICIES IN BORDER GATEWAY PROTOCOL

This application claims the benefit of IN Provisional Application No. 202041023284 filed Jun. 3, 2020, the entire content of which is herein incorporated by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Certain devices (i.e., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. Other routing protocols may include Border Gateway Protocol (BGP) that is an exterior gateway protocol used to exchange routing information among routers in different areas or domains. Devices that implement BGP use routing information to maintain a database of network reachability information, which is exchanged with other devices that implement BGP. BGP allows for policy-based routing. For example, routing policies are used to select from among a plurality of paths to a destination and to control the redistribution of routing information.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, label switching routers can forward traffic along a particular path through a network to a destination device, i.e., a Label Switched Path (LSP), using labels prepended to the traffic. An LSP defines a distinct path through the network to carry MPLS packets from the source device to a destination device. Routers may employ segment routing techniques, such as by using a Source Packet Routing in Networking (SPRING) paradigm, to advertise network segments between nodes using an interior gateway protocol (IGP) or border gateway protocol (BGP) and build single or multi-hop tunnels. To perform segment routing, an ingress router adds one or more labels in a label stack, e.g., a segment list, to a packet, and intermediate routers along the path remove labels from the label stack applied to the packet as the packet is forwarded through the network.

SUMMARY

In general, this disclosure describes techniques for provisioning non-colored segment routing label switched paths (LSPs) via segment routing policies in border gateway protocol (BGP). For example, segment routing LSPs may be associated with one or more policies. Policies may include constraints, such as colors, that identify respective tunnels with links conceptually belonging to the same class (e.g., for low-latency, etc.). Network devices (e.g., routers) use BGP to advertise policies for segment routing LSPs, referred to herein as segment routing policy advertisements.

Traditionally, a segment routing policy advertisement (e.g., BGP update message) includes a policy color field that specifies a value representing a color associated with a segment routing LSP. Routers that receive the segment routing policy advertisement typically treat the segment routing LSPs as a colored path, e.g., by storing the segment routing LSPs in a routing table that stores colored paths.

According to the disclosed techniques, network devices may send a segment routing policy advertisement (e.g., BGP update message) including a policy color field specified with a designated value (e.g., a maximum value of the policy color field) that causes an ingress network device that receives the segment routing policy advertisement to treat the segment routing LSPs associated with the policy as colorless, e.g., by storing the one or more paths in a routing table that stores non-color paths.

The techniques described herein may provide one or more technical advantages that realize a practical application. For example, by specifying a designated value in the policy color field, network devices may still use BGP to advertise segment routing policies even though the network devices establish a non-colored path.

In one example, this disclosure is directed to a method comprising receiving, by a network device, a segment routing policy advertisement specifying an endpoint of one or more paths and a policy color of the one or more paths, wherein the policy color is specified with a designated value that causes the network device to store the one or more paths in a data structure that stores non-colored paths; determining, by the network device, that the policy color is specified with the designated value; and in response to determining that the policy color is specified with the designated value, storing, by the network device, the one or more paths in the data structure that stores non-colored paths.

In another example, this disclosure is directed to a network device comprising: one or more interfaces; and a control unit in communication with the one or more interfaces, the control unit comprising one or more processors configured to: receive a segment routing policy advertisement specifying an egress of one or more paths, and a policy color of the one or more paths, wherein the policy color is specified with a designated value that causes the network device to store the one or more paths in a data structure that stores non-colored paths; determine that the policy color is specified with the designated value; and in response to determining that the policy color is specified with the designated value, store the one or more paths in the data structure that stores non-colored paths.

In a further example, this disclosure is directed to a system comprising: an egress network device of one or more paths; one or more intermediate network devices of the one or more paths; and an ingress network device of the one or more paths, wherein the one or more paths extend from the ingress network device to the egress network device via the one or more intermediate network devices, wherein the ingress network device is configured to: receive a segment routing policy advertisement specifying the egress network device as an endpoint of the one or more paths, and a policy color of the one or more paths, wherein the policy color is specified with a designated value that causes the ingress network device to store the one or more paths in a data structure that stores non-colored paths; determine that the policy color is specified with the designated value; and in response to determining that the policy color is specified with the designated value, store the one or more paths in the data structure that stores non-colored paths.

In a further example, this disclosure is directed to a controller comprising: one or more interfaces; and a control unit in communication with the one or more interfaces, the control unit comprising one or more processors configured to: receive segment identifiers that represent segments to a plurality of network devices of a segment routing tunnel; compute one or more paths, wherein the one or more paths are not associated with a color; and send a segment routing policy advertisement specifying an endpoint of the one or more paths, and a policy color of the one or more paths, wherein the policy color is specified with a designated value that indicates the one or more paths are to be stored in a data structure that stores non-colored paths.

The details of one or more examples are set forth in the accompanying drawings and the description below. Other features, objects, and advantages will be apparent from the description, drawings, and from the claims.

DETAILED DESCRIPTION

Figure 1:
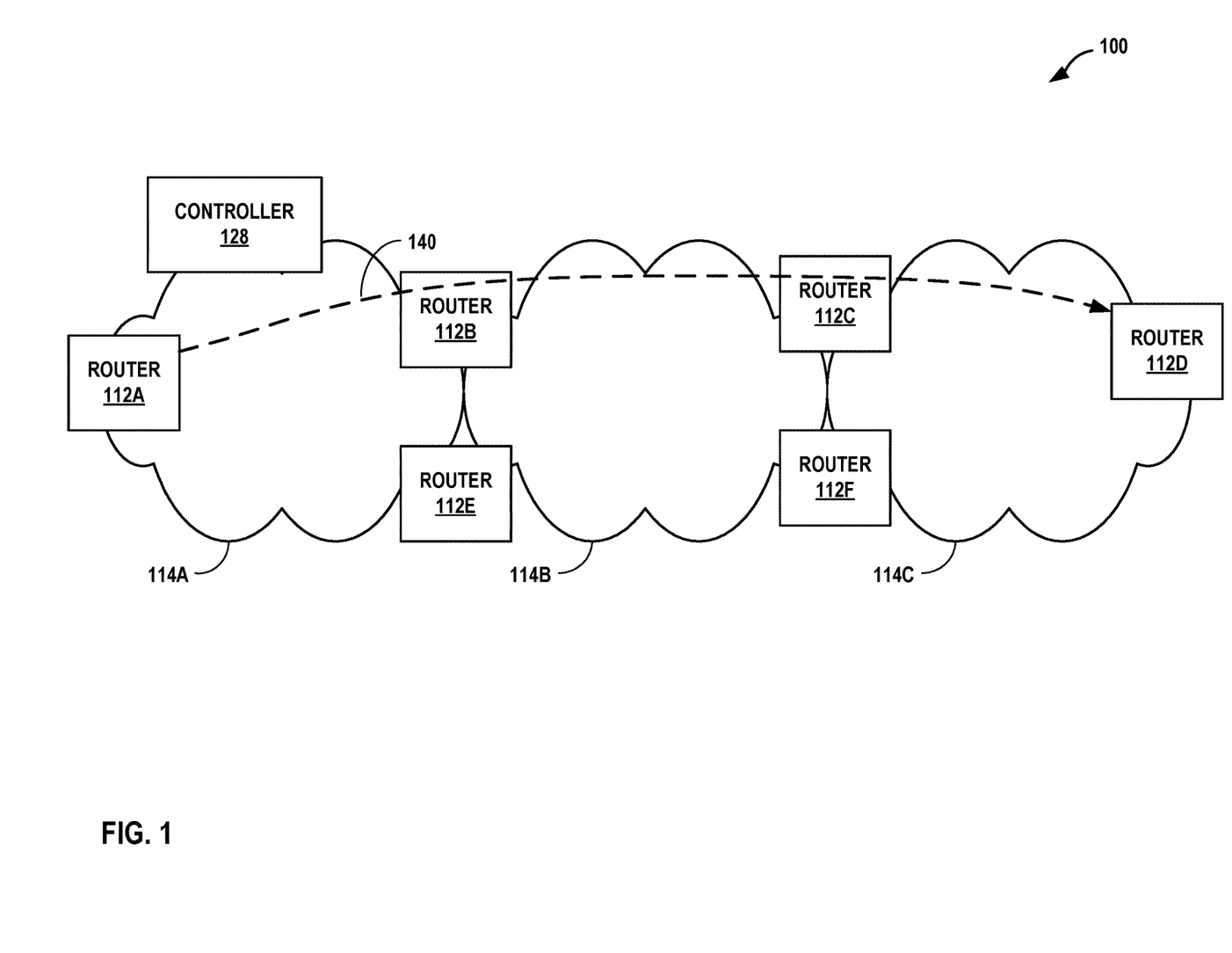
FIG. 1 is a block diagram illustrating an example network that supports use of segment routing policies in border gateway protocol (BGP) to provision non-colored segment routing label switched paths (LSPs), in accordance with techniques of this disclosure.

FIG. 1 is a block diagram illustrating an example network 100 that supports use of segment routing policies in border gateway protocol (BGP) to provision non-colored segment routing label switched paths (LSPs), in accordance with techniques of this disclosure.

In the example of FIG. 1, network 100 includes multiple routing areas or domains 114A-114C (collectively, "domains 114") and routers 112A-112F (collectively, "routers 112"). In some examples, domains 114 may each comprise an Interior Gateway Protocol (IGP) area or domain that includes a set of routers under common administrative control and that share a common routing protocol. Example IGPs include Intermediate System-Intermediate System (IS-IS) and Open Shortest Path First (OSPF). In the illustrated example of FIG. 1, routers 112 comprise border routers at the edge and between the different domains. For example, border routers 112A, 112B, and 112E are in domain 114A, border routers 112B, 112C, 112E, and 112F are in domain 114B, and border routers 112C, 112D, and 112F are in domain 114C. Routers 112B and 112E are in both domain 114A and domain 114B, and routers 112C and 112F are in both domain 114B and domain 114C. Although not shown in FIG. 1, each of domains 114 include one or more other network devices that operate as transit routers or switches to forward traffic within the respective domains and between border routers 112. Network 100 illustrated in FIG. 1 is merely one example network and may alternatively include any number of routing areas or domains.

As illustrated in FIG. 1, domain 114A also includes a controller device 128, which may operate as a software defined networking (SDN) controller or other centralized controller that provides control plane operations and management for routers and other network devices within one or more of domains 114A-114C. For purposes of explanation, controller device 128 is described herein as providing control plane operations and management for at least domain 114A and domain 114B. In other examples, each of domain 114B and domain 114C may include a designated, centralized controller.

As illustrated in the example of FIG. 1, router 112A serves as an ingress router of segment routing LSP 140 (otherwise referred to herein as "segment routing tunnel"), and hence, may be referred to in this disclosure as ingress router 112A. The sources of the network traffic received by ingress router 112A may comprise one or more devices (not shown) and/or any public or private network or the Internet that provides traffic to ingress router 112A in network 100. Furthermore, router 112D may, in this example, serve as an egress router of segment routing LSP 140, and hence, may be referred to in this disclosure as egress router 112D. The destinations of the network traffic being forwarded on inter-domain tunnel 140 may comprise one or more destination devices (not shown) and/or networks that may include local area networks (LANs) or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 100.

In the example of FIG. 1, routers 112 may use segment routing techniques, e.g., a SPRING paradigm, to advertise segments between nodes using an IGP or border gateway protocol (BGP) and build single or multi-hop tunnels within each domain 114. Segment routing, which may also be referred to as source packet routing or source packet routing in networking (SPRING), is a control-plane architecture that enables an ingress device to steer packet through a specific set of nodes and links in a network without relying on intermediate devices in the network to determine the path it should take. Segment routing may engage IGPs or BGP for advertising multiple type of segments. A first example type of segment is an "adjacency segment" that represents a strict-forwarded, typically single-hop tunnel that carries packets over a specific link between a router and a specific node, irrespective of the link cost. A second example type of segment is a "prefix segment" that typically represents a multi-hop tunnel using least cost path links between a router and a specific address prefix. A third example type of segment is a "binding segment" that represents a specific intra-domain tunnel between a router and a specific node or a specific address prefix.

In segment routing, the "path" information for segments is disseminated between each of domains 114 as part of the IGP link state information for the respective domain. The path information for the segments is disseminated or advertised between border routers 112 using BGP and/or to controller device 128 using a BGP link state (BGP-LS). Ingress router 112A is able to steer a packet through an ordered list of instructions (i.e., segments) by prepending one or more segment identifiers (SIDs) to the packet, such as adjacency SIDs that identify adjacency segments and/or node SIDs that identify specific prefixes. In other words, ingress router 112A can steer a packet through a desired set of nodes and links by prepending the packet with an appropriate combination (stack) of SIDs. Segment routing allows routers to enforce a flow through any topological path and service chain while maintaining per-flow state only at the ingress node to each domain.

Segment routing can be directly applied to the Multi-Protocol Label Switching (MPLS) architecture with no change in the forwarding plane. A network administrator or centralized controller, e.g., controller device 128, need only allocate SIDs to particular routers and the segment routing control plane architecture automatically builds the required MPLS forwarding constructs from a router to any other router. In some examples, a SID is encoded as an MPLS label, and an ordered list of SIDs is encoded as a stack of labels. The stack of SIDs is otherwise referred to herein as a "segment routing label stack." The SID of the segment to be processed is on the top of the label stack and, upon completion of a segment, the related label is popped from the label stack as the packet is forwarded through the network.

Segment routing is further described in Filsfils, et al., "Segment Routing Architecture," IETF RFC 8402, July 2018, while Segment Routing use cases are described in Filsfils, et al., "Segment Routing Use Cases," IETF Internet-Draft draft-filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft draft-ietf-spring-segment-routing-policy-06, Dec. 14, 2019; (2) Previdi, et al., "Source Packet Routing in Networking (SPRING) Problem Statement and Requirements," IETF RFC 7855, May 2016; and (3) Bashandy, et al., "Segment Routing with MPLS data plane," IETF RFC 8660, December 2019, each of which is incorporated herein by reference.

Further description of the establishment and use of prefix segments in network 100 is provided below as an illustrative example. Each of routers 112 may be associated with an address prefix. For instance, an administrator or controller device 128 may assign prefixes to one or more of routers 112. A prefix may be an address or block of addresses. The prefix corresponding to a node (e.g., a router) may comprise an Internet Protocol (IP) address (e.g., IPv4 or IPv6), a block of IP addresses, or another type of data identifying the node. Additionally, one or more of routers 112 may be configured with a segment identifier (SID) associated with the prefix. A router in network 100 may advertise its prefix and SID to neighboring routers within the same one of domains 114 of network 100. When a router receives an advertisement, the router may forward the advertisement to its neighboring routers. A router that merely forwards an advertisement is not considered to originate the advertisement. When a router receives an advertisement, the router determines, from the router's link state database (LSDB) or traffic engineering database (TED), whether the prefix specified in the advertisement is already associated with the SID specified in the advertisement. If this is the case and if the advertisement represents a new best path, the router may update a routing table in response to the advertisement such that the routing table indicates a next hop in the route to the prefix. If the advertisement represents an equal cost compared to the existing route, the router may add an equal-cost multi-path (ECMP) next hop to the existing route.

If the advertisement specifies a prefix and a SID that are not already in the receiving router's LSDB or TED, the router may calculate a route to the prefix specified in the advertisement. In some examples, the router may calculate the route according to a shortest path algorithm or a strict shortest path algorithm. Furthermore, in some examples, an advertisement may specify the type of algorithm to use to calculate the route to the prefix specified in the advertisement. Additionally, the router may associate the SID specified by the advertisement with the calculated route to the prefix specified by the advertisement. In other words, the router may generate data that associates the SID with the route.

The router may then install the route as an active route. Installing a route as an active route may comprise generating forwarding information that a forwarding component of the router may use to forward packets to next hops of routes associated with SIDs attached to the packets. For instance, installing the route as an active route may comprise generating information in a forwarding table that maps a SID to an interface card attached to a link to a next hop of the route associated with the SID.

After installing a route as an active route, a router may receive a packet. In response to receiving the packet, the router may determine whether a stack of one or more labels is attached to the packet. The stack of labels comprises an ordered sequence of labels. If the stack of labels includes one or more labels, the router may determine a next hop of a route associated with the active label of the stack. The active label may be the label at the "top" of the stack. For instance, the active label may be the label occurring first in an ordered sequence of labels attached to the packet. If the next hop of the route associated with the active label advertised the active SID, the router (referred to as a penultimate hop popping (PHP) router) may remove the active label from the stack of labels attached to the packet, potentially leaving one or more labels remaining attached to the packet. In other words, the router may "pop" the active label from the stack. The router may then forward the packet, along with the remaining labels of the stack, to a next hop on the route associated with the active label. This system may allow a source node, such as ingress router 112A, to control the path a packet takes through network 100.

If there is no stack of labels attached to the packet when the router receives the packet or if there are no remaining labels attached to the packet after the router removes the active label, the router forwards the packet to another node in network 100 without further use of segment routing. For instance, the router may forward the packet according to an IP address of the packet.

In some examples, computational constraints, such as colors, may be applied to segment routing LSPs. Segment routing LSPs associated with colors are referred to herein as colored paths. Colors, in some cases, identify a respective tunnel as being part of a common type of attribute, such as latency, bandwidth, packet drop rate, address family (e.g., IPv4 or IPv6), software license agreement (SLA) requirements, quality requirement, tunneling protocol, path computation algorithm, weight, etc. For example, each segment routing LSP associated with the color "blue" may include a group of links or nodes of a first type of attribute (e.g., low latency) and each segment routing LSP associated with the color "red" may include a group of links or nodes of a second type of attribute (e.g., bandwidth).

Controller 128 (or node) may configure one or more segment routing policies each associated with one or more candidate paths, e.g., colored paths. A candidate path may be expressed as a segment list or a set of segment lists. A segment routing policy enables the instantiation of an ordered list of segments on a node for implementing a segment routing policy with a specific intent (e.g., optimization objective) for steering traffic along a path selected from the candidate paths.

A router may install the selected path (i.e., active route) in its forwarding plane to forward packets according to the segment routing policy. For example, the router may install a keyed entry in its forwarding plane to steer packets matching the entry to the selected path of the segment routing policy. As one example, a segment routing policy is identified through a header of a packet, referred to as tuple, including a policy color and endpoint, or a tuple including headend, policy color, and endpoint.

Controller 128 (or in some instances an egress router or route reflector) may use border gateway protocol (BGP) to advertise a segment routing policy. For example, controller 128 may advertise a BGP message (e.g., BGP update message) specifying information of a segment routing policy associated with one or more candidate paths (e.g., segment list or set of segment lists). For example, the BGP message may include a subsequent address family identifier (SAFI) whose network layer reachability information (NLRI) identifies the segment routing policy. The NLRI may specify, for example, an NLRI length, route distinguisher, policy color, and endpoint. The route distinguisher uniquely identifies a candidate path of the same segment routing policy. The policy color is used to match the color of the destination prefixes to steer traffic according to a segment routing policy. The endpoint identifies the destination of a segment routing policy. The endpoint may represent a node (e.g., IPv4 or IPv6 address) or a set of nodes (e.g., anycast address).

The BGP message may also specify one or more candidate paths associated with the segment routing policy, such as a single segment or a segment list of the segment routing policy. As one example, the BGP message may include sub-type, length, values (sub-TLVs) that specify segment lists of the segment routing policy and, in some examples, attributes of the segments (e.g., weight). The BGP message may also include other information of the candidate paths of the segment routing policy, such as binding SID, preference of candidate path, priority, policy name, explicit null label policy (ENLP) and others. Additional information with respect to advertising segment routing policies in BGP is described in S. Previdi, et al., "Advertising Segment Routing Policies in BGP," draft-ietf-idr-segment-routing-te-policy-08, Nov. 18, 2019, the entire content of which is incorporated by reference herein.

Controller 128 advertises the BGP message including a segment routing policy to an ingress router, e.g., ingress router 12A. For example, a route target extended community attached to the BGP message indicates the intended ingress router of the BGP message. In response to receiving the BGP message including the segment routing policy, the ingress router stores the candidate paths (e.g., segment list or set of segment lists) learned from the BGP message in a main routing table (e.g., BGP table) that stores all routes learned via BGP.

The ingress router selects a path from the candidate paths for the segment routing policy based on one or more attributes including local preference, originate, AS path length, origin code, Multi Exit Discriminator (MED), external BGP (eBGP) path over internal BGP (iBGP) path, shortest IGP path to BGP next hop, oldest path, router ID, neighbor IP address, weight and others. Because the BGP message includes a policy color (e.g., specified by the policy color field), the ingress router typically stores the selected path in a routing table that stores colored paths (referred to herein as "color table" or "color routing table"). The color table may store, as one example, an egress address of the path, outgoing interface, and any labels to attach to an outgoing packet. Based on the color table, the ingress router may install an active route (e.g., a keyed entry) in its forwarding plane to steer packets along the selected colored path (i.e., active route) of the segment routing policy.

In some examples, some routers may not use or support colored paths. In these examples, these routers typically store non-colored paths from the candidate paths for the segment routing policy in a routing table that stores non-colored paths (also referred to herein as "non-color table" or "non-color routing table"). Without the techniques described in this disclosure, routers that advertise segment routing policies in BGP are unable to dynamically provision non-colored segment routing LSPs with BGP.

In accordance with the techniques described in this disclosure, an ingress router may receive, e.g., from a device (e.g., controller, egress device, or route reflector), a BGP message including a policy color specified with a designated value that causes the ingress router to treat the one or more candidate paths of the segment routing policy as non-colored paths (e.g., by storing the one or more candidate paths in a non-color table).

As one example, the NLRI of the BGP message, as described in draft-ietf-idr-segment-routing-te-policy-08 (incorporated above), includes a policy color field that is 4 octets with a bit range from 0 to 4,294,967,295. In accordance with the disclosed techniques, a device may specify a designated value, for example, as a maximum value of the policy color field (e.g., 4,294,967,295), that causes the ingress router to store the one or more candidate paths of the segment routing policy in a non-color table. For example, controller 128 (or egress router 112D) sends a BGP message, e.g., BGP update message, specifying an endpoint of one or more candidate paths (e.g., segment lists), and a policy color field specified with a designated value of 4,294,967,295. In response to receiving the BGP message, ingress router 112A determines whether the policy color is specified with the designated value. In this example, ingress router 112A determines that the policy color is specified with a designated value of 4,294,967,295, and in response, stores the one or more candidate paths in a table that stores non-colored paths. Although the example is described with respect to a designated value of a maximum value of a policy color field that is 4 octets, the designated value may represent any designated value that causes a network device that receives the segment routing policy advertisement to treat the one or more paths as colorless.

Based on the non-color table, ingress router 112A selects a path from the candidate paths for the segment routing policy and installs an active route in its forwarding plane to steer packets along the selected path. Prior to storing the one or more paths, ingress router 112A may, for example, remove the route distinguisher and policy color and install the route as an Internet protocol (IP) destination (e.g., identified by the endpoint of the NLRI) route in the non-color table.

Alternatively, or additionally, if the policy color field is specified with a value other than the designated value, e.g., any value from 0 to 4,294,967,294, ingress router 12A treats the one or more candidate paths of the segment routing policy as colored paths (e.g., by storing the one or more candidate paths in a color table).

Figure 2:
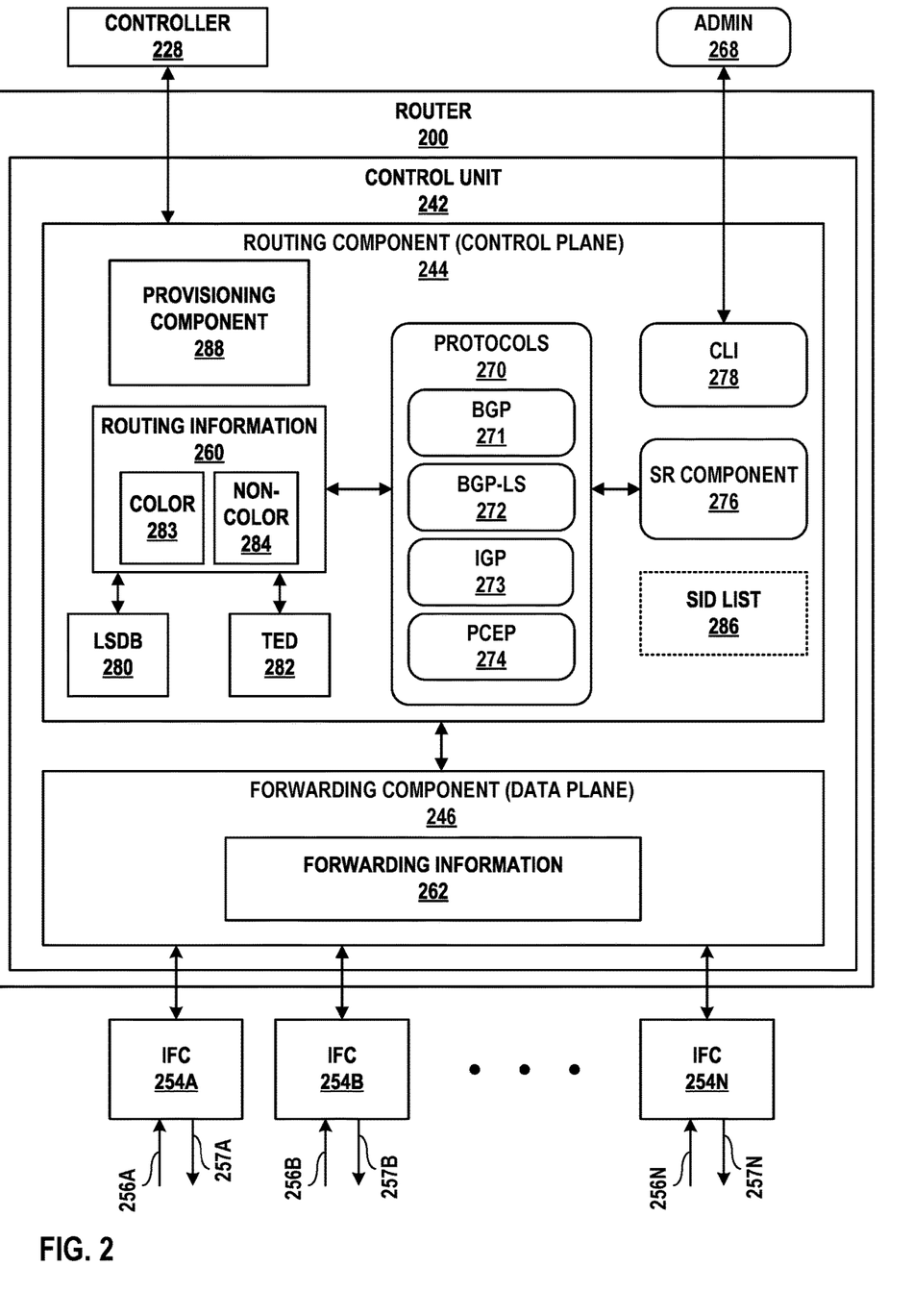
FIG. 2 is a block diagram illustrating an example router capable of operating in accordance with the techniques of this disclosure.

FIG. 2 is a block diagram illustrating an example router 200 capable of operating in accordance with the techniques described herein. Router 200 may represent ingress router 112A of FIG. 1. While described with respect to router 200, the techniques may be implemented by any other type of network device capable of implementing segment routing. Thus, while described with respect to router 200, the techniques should not be limited to router 200 described with respect to the example of FIG. 2.

In the example of FIG. 2, router 200 includes interface cards 254A-254N ("IFCs 254") that receive and send data units, such as packet flows, via inbound network links 256A-256N and outbound network links 257A-257N, respectively. Router 200 may include a chassis (not shown) having a number of slots for receiving a set of cards, including IFCs 254. Each card may be inserted into a corresponding slot of the chassis for electrically coupling the card to routing component 244 via high-speed switch (not shown), which may comprise, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 200 may interface with links of a network.

In general, router 200 may include a control unit 242 that determines routes of received packets and forwards the packets accordingly via IFCs 254. In the example of FIG. 2, control unit 242 includes routing component (control plane) 244 that configures and controls packet forwarding operations applied by forwarding component (data plane) 246.

Routing component 244 provides an operating environment for various routing protocols 270 that execute at different layers of a network stack. Routing component 244 is responsible for the maintenance of routing information 260 to reflect the current topology of a network and other network entities to which router 200 is connected. In particular, routing protocols periodically update routing information 260 to accurately reflect the topology of the network and other entities based on routing protocol messages received by router 200. The protocols may be software processes executing on one or more processors. For example, routing component 244 includes network protocols that operate at a network layer of the network stack, which are typically implemented as executable software instructions.

In the example of FIG. 2, protocols 270 may include Border Gateway Protocol (BGP) 271 to exchange routing and reachability information among routing domains in a network, and BGP-LS 272 to exchange link state and traffic engineering information among routing domains in the network. BGP 271 may be extended to include a subsequent address family identifier (SAFI) (e.g., with a codepoint 73) with NLRI that identifies an SR policy. As described above, a BGP message including the SR policy includes at least, for example, a route distinguisher, an endpoint, and a policy color field. Additional examples of a BGP message including the SR policy is described in S. Previdi, et al., "Advertising Segment Routing Policies in BGP," draft-ietf-idr-segment-routing-te-policy-08, Nov. 18, 2019, which is incorporated above. The BGP-LS protocol is described in additional detail in H. Gredler, et al., "North-Bound Distribution of Link-State and Traffic Engineering (TE) Information using BGP," Internet Engineering Task Force (IETF) RFC 7752, March 2016, the entire contents of which are incorporated herein by reference.

Protocols 270 may also include IGP 273 to exchange link state information, and facilitate forwarding of packets or other data units between routers within each of the routing domains. In some examples, IGP 273 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 273 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 273 may include IS-IS extensions that support traffic engineering, as described in RFC 5305, by T. Li et al., entitled "IS-IS Extensions for Traffic Engineering," dated October 2008. In some examples, router 200 may include both an OSPF component and an IS-IS component.

Protocols 270 may also include configuration protocols. For example, protocols 270 may include PCEP 274 in accordance with RFC 5440, by J P. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples where router 200 comprises an ingress router, controller device 228 (e.g., controller 128 of FIG. 1) may configure router 200 with SID list 286 for a segment routing LSP via PCEP 274 or a NETCONF component (not shown). Protocols 270 may include other routing protocols (not shown), such as Label Distribution Protocol (LDP), Resource Reservation Protocol with Traffic Extensions (RSVP-TE), routing information protocol (RIP), or other network protocols.

By executing the routing protocols, routing component 244 identifies existing routes through the network and determines new routes through the network. Routing component 244 stores routing information 260 that includes, for example, known routes through the network. In this example, routing information 260 stores, for example, path information for label switched paths (e.g., segment routing LSPs). In some examples, routing information 260 may include a data structure to store color paths (e.g., color paths 284) and/or a data structure to store non-color paths (e.g., non-color paths 286).

Forwarding component 246 stores forwarding information 262 that includes destinations of outbound links 257. Forwarding information 262 may be generated in accordance with routing information 260.

Routing component 244 includes a segment routing (SR) component 276 to implement segment routing techniques that specify how router 200 may provision and advertise SIDs for adjacency segments, prefix segments, or binding segments. As described in FIG. 1, an ingress router may use the SIDs to steer a packet through a controlled set of instructions, called segments, by prepending the packet with a SID label stack in a segment routing header. Alternatively, or additionally, router 200 may receive SID list 286 from controller 228 for an inter-domain or inter-AS segment routing tunnel. Based on SID list 286, routing component 244 creates a segment routing label stack for the segment routing tunnel. Upon receipt of packets destined for the egress router of the segment routing tunnel, forwarding component 246 appends the segment routing label stack onto the packets and forwards the packets in accordance with the segment routing label stack.

Routing component 244 includes a link state database (LSDB) 280 for storing domain topology information including SIDs and labels for provisioned segments, e.g., adjacency segments, prefix segments, and binding segments, within the routing domain of router 200. The contents of LSDB 280 are maintained in accordance with an IGP 273 and have the scope of a single routing domain. Routing component 244 further includes a Traffic Engineering Database (TED) 282 that augments LSDB 280 with TE link attributes. Each of LSDB 280 and TED 282 may be in the form of a variety of data structures, such as a number of tables, link lists, radix trees, databases, flat files, or other data structures.

In accordance with the described techniques, routing component 244 includes a provisioning component 288 configured to provision non-colored segment routing LSPs via segment routing policies in BGP. Although described with respect to provisioning component 288, the techniques described in this disclosure may be performed by SR component 276 of any other component within routing component 244.

As one example, router 200 may use BGP-LS 272 to establish a BGP session with controller 228 (or to an egress router) and receive a BGP message including a segment routing policy associated with one or more candidate paths (e.g., segment routing LSPs) from router 200 (operating as an ingress router) to an egress router. Alternatively, or additionally, router 200 may use BGP 271 to establish a BGP session with another router (e.g., egress router) of the segment routing LSP and receive a BGP message including a segment routing policy associated with one or more candidate paths. Provisioning component 288 may determine whether a received BGP message includes a policy color field with a designated value that causes the ingress router to treat the one or more candidate paths of the segment routing policy as non-colored paths.

Provisioning component 288 determines, based on the value specified in the policy color field included in the BGP message, whether to store the one or more candidate paths of the segment routing policy in a color table or a non-color table. If the policy color field is specified with a designated value, e.g., a maximum value of the policy color field, provisioning component 288 determines that the one or more candidate paths associated with the segment routing policy are to be stored in non-color table 284. Alternatively, if the policy color field is specified with a value other than the designated value, e.g., a value from 0 to the maximum value minus one, provisioning component 288 determines that the one or more candidate paths are to be stored in color table 283.

In the example of FIG. 2, routing engine 244 includes a command line interface (CLI) 278 that provides access for an administrator ("admin") 268 to monitor, configure, or otherwise manage router 200. Admin 268 may instruct router 200 via CLI 278 to store one or more candidate paths of a segment routing policy in a color table if the policy color of a BGP message includes a designated value.

Based on the color or non-color table, router 200 may install a selected path as an active route. Installing an active route may comprise generating forwarding information 262 in accordance with routing information 260 (e.g., non-color table 284). For instance, installing the active route may comprise generating forwarding information that maps a SID for a next hop of the non-colored path to one of interface cards 254 attached to an outbound link to the next hop associated with the SID.

In some examples in which router 200 may represent a router of a non-color path other than an ingress router (e.g., an egress router), provisioning component 288 of router 200 may use BGP 271 to send a BGP message specifying an endpoint of one or more paths and a policy color field specified with a designated value, e.g., a maximum value of the policy color field to cause an ingress router that receives the BGP message to treat the one or more candidate paths of the segment routing policy as non-colored paths.

Although described for purposes of example with respect to a router, router 200 may be more generally a network device having routing functionality, and need not necessarily be a dedicated routing device. The architecture of router 200 illustrated in FIG. 2 is shown for example purposes only. The techniques of this disclosure are not limited to this architecture. In other examples, router 200 may be configured in a variety of ways. In one example, some of the functionally of control unit 242 may be distributed within IFCs 254. In another example, control unit 242 may comprise a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

Figure 3:
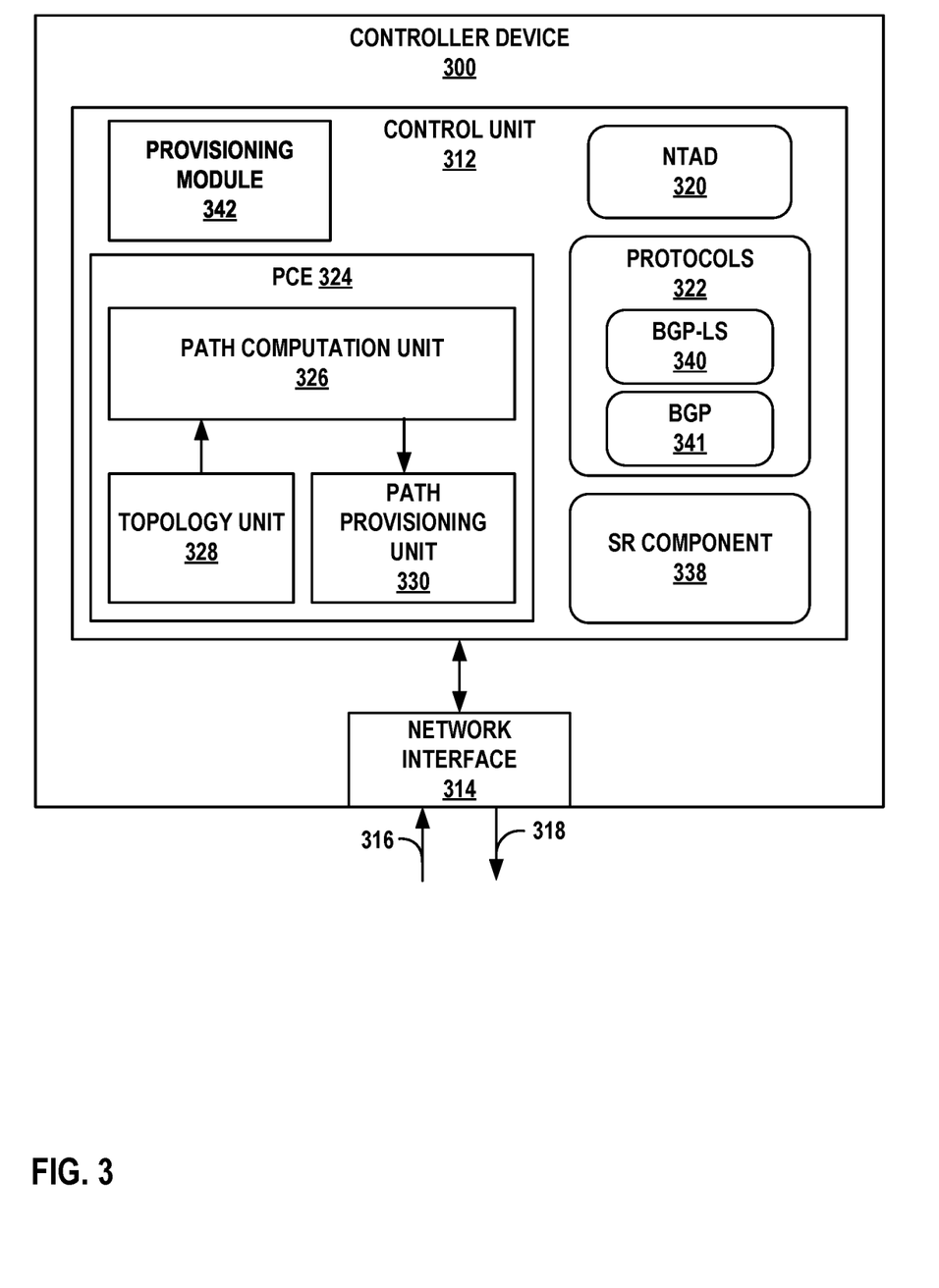
FIG. 3 is a block diagram illustrating an example controller capable of operating in accordance with the techniques of this disclosure.

FIG. 3 is a block diagram illustrating an example controller capable of operating in accordance with the techniques of this disclosure. Controller 300 may represent an example implementation of controller device 128 of FIG. 1 or controller device 228 of FIG. 2. For purposes of illustration, controller device 300 is described herein within the context of network 100 of FIG. 1. The architecture of controller device 300 illustrated in FIG. 3 is shown for example purposes only and should not be limited to this architecture. In other examples, controller device 300 may be configured in a variety of ways.

Controller device 300 includes a control unit 312 coupled to a network interface 314 to exchange packets with other network devices by inbound link 316 and outbound link 318. Control unit 312 may include one or more processors (not shown) that execute software instructions, such as those used to define a software or computer program, stored to a computer-readable storage medium (not shown). Alternatively, or additionally, control unit 312 may comprise dedicated hardware for performing the techniques described herein.

Control unit 312 provides an operating environment for network topology abstractor daemon (NTAD) 320, path computation element (PCE) 324, and segment routing (SR)

component 338. In one example, these units may be implemented as one or more processes executing on one or more virtual machines of one or more servers. That is, while generally illustrated and described as executing on a single controller device 128, aspects of these units may be delegated to other computing devices. Control unit 312 also provides an operating environment for several protocols 322, including BGP-LS 340 and BGP 341.

Control unit 312 may use BGP-LS 340 to receive link state information from border routers within one or more domains of a computer network, e.g., routers 112 in domains 114 of network 100 from FIG. 1. For example, SR component 338 uses BGP-LS 340 to receive SIDs (e.g., prefix SIDs, adjacency SIDs, and/or binding SIDs) in BGP-LS messages from one or more border routers. Control unit 312 may then forward the received link state information to NTAD 320. NTAD 320 may generate a network topology based on the received link state information.

As illustrated in FIG. 3, PCE 324 includes a path computation unit 326, a topology unit 328, and a path provisioning unit 330. NTAD 320 may forward the topology data to topology unit 328 of PCE 324. Topology unit 328 may receive the topology data describing available resources of the computer network, including access, aggregation, and edge nodes, interfaces thereof, and interconnecting communication links. Path computation unit 326 of PCE 324 may use the topology data received by topology unit 328 to compute paths across the computer network. For example, SR component 338 uses path computation unit 326 of PCE 324 to provision a segment routing LSP as a list of SIDs along a desired path from an ingress router toward an egress router. In some examples, path computation unit 326 may provision a segment routing LSPs with or without a color constraint. Upon computing the paths, path computation unit 326 may schedule the paths for provisioning by path provisioning unit 330. A computed path includes path information usable by path provisioning unit 330 to establish the path in the network. For example, path provisioning unit 330 may send the list of SIDs for a segment routing LSP.

Control unit 312 may use BGP-LS 340 to send a list of SIDs (and other information such as color information) for a segment routing LSP to an ingress router of the segment routing LSP. In some examples, PCE 324 may program the ingress router of the segment routing LSP with the list of SIDs of the segment routing LSP.

In accordance with the techniques described in this disclosure, control unit 312 includes provisioning module 342 that uses BGP 341 that is extended to generate a BGP message specifying a policy color with a designated value that causes the ingress router to treat the one or more candidate paths of the segment routing policy as non-colored paths, in accordance with the techniques described in this disclosure. For example, provisioning module 342 uses BGP 341 to send a BGP message including a policy color field specified with a designated value that causes an ingress router receiving the BGP message to treat the one or more candidate paths of the segment routing policy as non-colored paths. For example, provisioning module 342 may specify a designated value, such as a maximum value of the policy color field (e.g., 4,294,967,295) for the policy color field. Alternatively, or additionally, provisioning module 342 uses BGP 341 to send a BGP message including a policy color field specified with a value other than the designated value, e.g., a value from 0 to the maximum value minus 1 (e.g., 4,294,967,294) that causes an ingress router to store the one or more candidate paths of the segment routing policy in a color table.

In response to receiving the BGP message, an ingress router, e.g., ingress router 112A of FIG. 1, determines whether the policy color field is specified with the designated value. For example, if the policy color field is specified with a designated value of 4,294,967,295, ingress router 112A stores the one or more candidate paths associated with the segment routing policy in a routing table that stores non-colored paths. In some examples, ingress router 112A may remove the route distinguisher and policy color and install the route as an Internet protocol (IP) destination (e.g., identified by the endpoint of the NLRI) route in the non-color table. If the policy color is specified with a value other than the designated value, ingress router 112A stores the one or more candidate paths associated with the segment routing policy in a routing table that stores colored paths.

Figure 4:
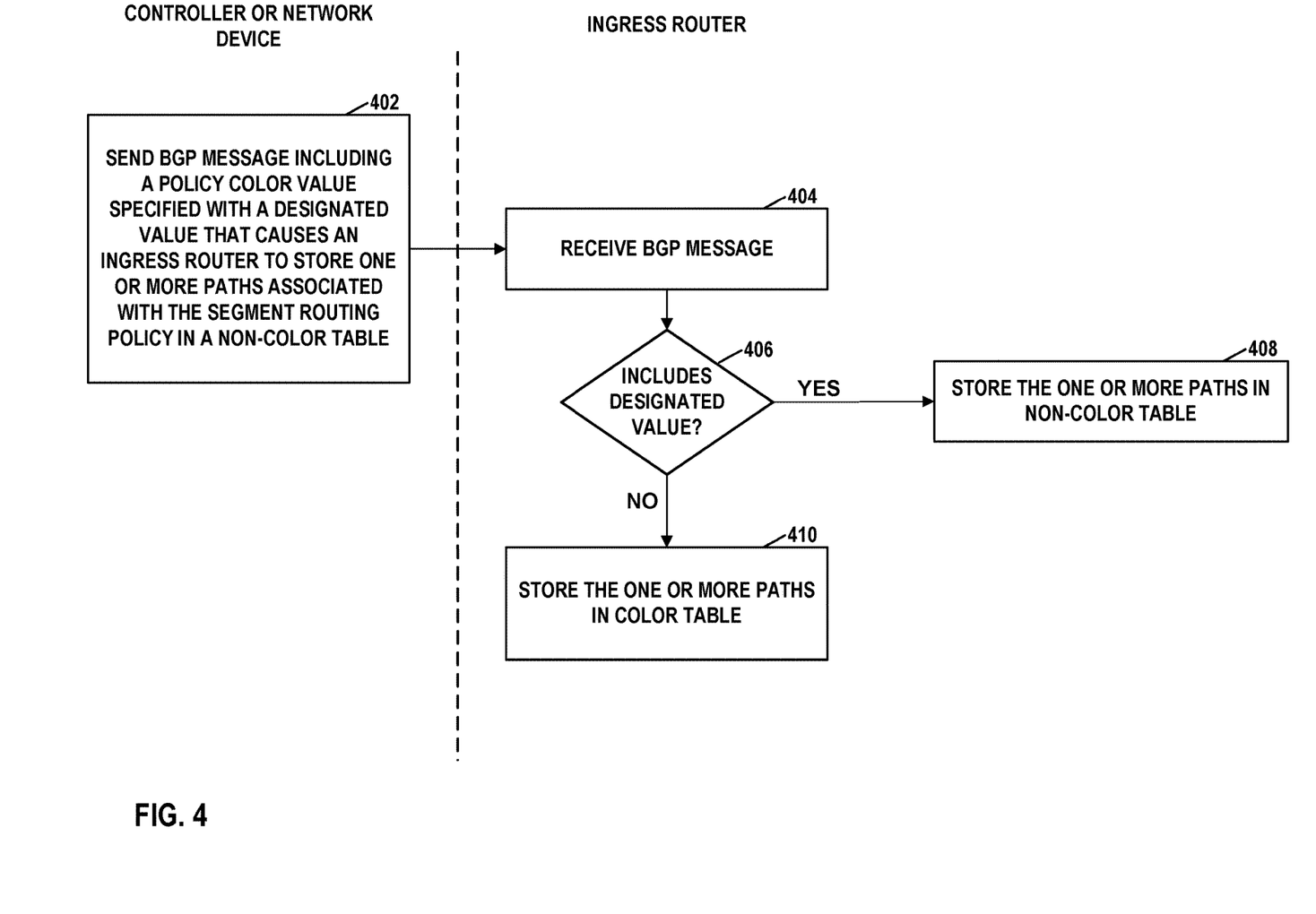
FIG. 4 is a flowchart illustrating an example operation of provisioning a non-colored segment routing label switched path via segment routing policies in BGP, in accordance with the techniques of this disclosure.

FIG. 4 is a flowchart illustrating an example operation of provisioning a non-colored segment routing label switched path via segment routing policies in BGP, in accordance with techniques described in this disclosure. The example operation is described herein with respect to router 200 of FIG. 2, and with respect to controller 300 of FIG. 3. Similar operations may be performed by any of routers 112 and controller 128 of FIG. 1.

In the example of FIG. 4, controller 300 (or any of non-ingress routers 112B-112F of FIG. 1) sends a BGP message including a policy color value specified with a designated value that causes an ingress router that receives the BGP message to store one or more paths associated with the segment routing policy to be stored in a non-color table (402). For example, control unit 312 of controller 300 may use BGP-LS 340 to receive link state information from border routers within one or more domains of a computer network, e.g., routers 112 in domains 114 of network 100 from FIG. 1. For example, SR component 338 uses BGP-LS 340 to receive SIDs (e.g., prefix SIDs, adjacency SIDs, and/or binding SIDs) in BGP-LS messages from one or more border routers.

PCE 324 of controller 300 may provision a segment routing LSP as a list of SIDs along a desired path from an ingress router toward an egress router. In some examples, PCE 324 may provision a segment routing LSPs without a color constraint. In these examples, provisioning module 342 sends a BGP message specifying a designated value as the maximum value (e.g., 4,294,967,295) of the policy color field. Controller 300 establishes a BGP session with an ingress router (e.g., router 200 of FIG. 2) and sends the BGP message to the ingress router via outbound link 318.

Ingress router 200 receives the BGP message (404) and determines whether the BGP message includes the designated value (406). For example, ingress router 200 receives the BGP message via any of inbound links 256 and passes the BGP message to provisioning component 288. Provisioning component 288 of router 200 determines, based on the value specified in the policy color field included in the BGP message, whether to store the one or more candidate paths of the segment routing policy in a color table or a non-color table. If the policy color field is specified with a designated value ("YES" of step 406), such as a maximum value of the policy color field, provisioning component 288 determines that the one or more candidate paths associated with the segment routing policy are to be stored in non-color table 284 (408). Alternatively, if the policy color field is specified with a value other than the designated value ("NO" of step 406), such as a value from 0 to the maximum value minus one, provisioning component 288 determines that the one or more candidate paths are to be stored in color table 283 (410).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
   receiving, by a network device, a segment routing policy advertisement specifying an endpoint of one or more paths and a policy color of the one or more paths, wherein the policy color is specified with a designated value that causes the network device to store the one or more paths in a data structure that stores non-colored paths;
   determining, by the network device, that the policy color is specified with the designated value; and
   in response to determining that the policy color is specified with the designated value, storing, by the network device, the one or more paths in the data structure that stores non-colored paths.

2. The method of claim 1, wherein the designated value comprises a maximum value of the policy color.

3. The method of claim 2, wherein the maximum value of the policy color is 4,294,967,295.

4. The method of claim 1, wherein the segment routing policy advertisement comprises a border gateway protocol (BGP) message.

5. The method of claim 1, wherein receiving the segment routing policy advertisement comprises receiving, by the network device and from another network device of the one or more paths, the segment routing policy advertisement.

6. The method of claim 1, wherein receiving the segment routing policy advertisement comprises receiving, by the network device and from a controller that manages network devices of the one or more paths, the segment routing policy advertisement.

7. The method of claim 1, wherein storing the one or more paths in the data structure that stores non-color routes further comprises:
   removing, by the network device and prior to storing the one or more paths in the data structure that stores non-colored routes, a route distinguisher and the policy color of the one or more paths.

8. A network device comprising:
   one or more interfaces; and
   a control unit in communication with the one or more interfaces, the control unit comprising one or more processors configured to:
      receive a segment routing policy advertisement specifying an egress of one or more paths, and a policy color of the one or more paths, wherein the policy color is specified with a designated value that causes the network device to store the one or more paths in a data structure that stores non-colored paths;
      determine that the policy color is specified with the designated value; and
      in response to determining that the policy color is specified with the designated value, store the one or more paths in the data structure that stores non-colored paths.

9. The network device of claim 8, wherein the designated value comprises a maximum value of the policy color.

10. The network device of claim 9, wherein the maximum value of the policy color is 4,294,967,295.

11. The network device of claim 8, wherein the segment routing policy advertisement comprises a border gateway protocol (BGP) message.

12. The network device of claim 8, wherein, to receive the segment routing policy advertisement, the one or more processors are further configured to receive, from the egress, the segment routing policy advertisement.

13. The network device of claim 8, wherein, to receive the segment routing policy advertisement, the one or more processors are further configured to receive, from a controller that manages network devices of the one or more paths, the segment routing policy advertisement.

14. The network device of claim 8, wherein, to store the one or more paths in the data structure that stores non-color paths, the one or more processors are further configured to:
   remove, prior to storing the one or more paths in the data structure that stores non-colored paths, a route distinguisher and the policy color of the one or more paths.

15. A system comprising:
   an egress network device of one or more paths;
   one or more intermediate network devices of the one or more paths; and
   an ingress network device of the one or more paths, wherein the one or more paths extend from the ingress network device to the egress network device via the one or more intermediate network devices, wherein the ingress network device is configured to:

receive a segment routing policy advertisement specifying the egress network device as an endpoint of the one or more paths, and a policy color of the one or more paths, wherein the policy color is specified with a designated value that causes the ingress network device to store the one or more paths in a data structure that stores non-colored paths;

determine that the policy color is specified with the designated value; and in response to determining that the policy color is specified with the designated value, store the one or more paths in the data structure that stores non-colored paths.

16. The system of claim 15, wherein the designated value comprises a maximum value of the policy color.

17. The system of claim 16, wherein the maximum value of the policy color is 4,294,967,295.

18. The system of claim 15, wherein the segment routing policy advertisement comprises a border gateway protocol (BGP) message.

19. The system of claim 15, wherein the egress network device is configured to:

send the segment routing policy advertisement specifying the endpoint of the one or more paths and the policy color of the one or more paths, wherein the policy color is specified with the designated value that causes the ingress network device to store the one or more paths in the data structure that stores non-colored paths.

20. The system of claim 15, further comprising a controller to manage a plurality of network devices, wherein the controller comprises one or more processors configured to:

receive a request for the one or more paths that extend from the ingress network device to the egress network device of the plurality of network devices;

determine that the segment routing tunnel is not associated with a color;

send the segment routing policy advertisement specifying the endpoint of the one or more paths and the policy color of the one or more paths, wherein the policy color is specified with the designated value that causes the ingress network device to store the one or more paths in the data structure that stores non-colored paths.

* * * * *